United States Patent
Matsumoto et al.

(10) Patent No.: US 7,714,845 B2
(45) Date of Patent: May 11, 2010

(54) TOUCH PANEL AND INPUT DEVICE INCLUDING THE SAME

(75) Inventors: Kenichi Matsumoto, Hirakata (JP); Tetsuo Murakami, Hirakata (JP)

(73) Assignee: Panasonic Corporation, Osaka (JP)

( * ) Notice: Subject to any disclaimer, the term of this patent is extended or adjusted under 35 U.S.C. 154(b) by 1012 days.

(21) Appl. No.: 10/967,136

(22) Filed: Oct. 19, 2004

(65) Prior Publication Data
US 2005/0099401 A1   May 12, 2005

(30) Foreign Application Priority Data
Nov. 7, 2003   (JP)   ............... 2003-378271

(51) Int. Cl.
*G06F 3/041* (2006.01)
(52) U.S. Cl. ...................... 345/173; 345/177
(58) Field of Classification Search .......... 345/173–178
See application file for complete search history.

(56) References Cited

U.S. PATENT DOCUMENTS

| | | | |
|---|---|---|---|
| 5,430,964 A * | 7/1995 | Inbar et al. ................ 40/361 |
| 6,118,435 A * | 9/2000 | Fujita et al. ................ 345/173 |
| 7,176,903 B2 * | 2/2007 | Katsuki et al. .............. 345/173 |
| 7,215,329 B2 * | 5/2007 | Yoshikawa et al. .......... 345/173 |
| 7,227,537 B2 * | 6/2007 | Nakayama et al. .......... 345/173 |
| 7,236,616 B1 * | 6/2007 | Scott ......................... 382/124 |
| 2003/0067448 A1 | 4/2003 | Park | |

FOREIGN PATENT DOCUMENTS

| | | |
|---|---|---|
| JP | 60-160432 | 8/1985 |
| JP | 7-169367 | 7/1995 |
| JP | 09-035569 | 2/1997 |

OTHER PUBLICATIONS

Japanese Office Action issued Feb. 3, 2009 in Japanese Application No. 2003-378271, which is a foreign counterpart of the present application.

* cited by examiner

*Primary Examiner*—Chanh Nguyen
*Assistant Examiner*—Calvin C Ma
(74) *Attorney, Agent, or Firm*—Wenderoth, Lind & Ponack, L.L.P.

(57) ABSTRACT

A touch panel includes a light-transmissible, piezoelectric substrate having a first surface and a second surface opposite to the first surface of the piezoelectric substrate, a first light transmissible, resistor layer provided on the first surface of the substrate, and a second light transmissible, resistor layer provided on the second surface of the substrate. A portion of the piezoelectric substrate, upon being pressed, has an electric resistance locally decreasing. The touch panel, even having a simple construction, can avoid reflections of external light and suppress a Newton's ring.

22 Claims, 3 Drawing Sheets

TOUCH PANEL AND INPUT DEVICE INCLUDING THE SAME

FIELD OF THE INVENTION

The present invention relates to a touch panel used for inputting data to an electronic apparatus, and to an input device including the touch panel.

BACKGROUND OF THE INVENTION

As electronic apparatuses have had multi-functions, the apparatuses employ light-transmissible touch panels mounted on screens of displays, such as liquid crystal displays, of the apparatuses. A touch panel is simply manipulated by a user to allow him/her to view and select a character, an icon, and a symbol displayed on the screen with a finger or a dedicated pen for activating desired functions.

A conventional touch panel disclosed in Japanese Patent Laid-Open Publication No. 7-169367 will be explained. FIG. 5 is a cross sectional view of the conventional touch panel. A light transmissible upper resistor layer 3 made of, for example, indium tin oxide is provided on the lower surface of an upper substrate 1 made of light transmissible film. Similarly, a light transmissible lower resistor layer 4 made of, for example, indium tin oxide is provided on the upper surface of a lower substrate 2 made of light transmissible film. Plural dot spacers 5 made of insulating resin are provided at equal intervals on the upper surface of the lower resistor layer 4. A pair of upper electrodes (not shown) are provided on both ends of the upper resistor layer 3 while a pair of lower electrodes (not shown) are provided on both ends of the lower resistor layer 4 and extend in a direction orthogonal to the upper electrodes. The upper substrate 1 is bonded at its outer edge to the upper end of a frame-shaped spacer 6 by an adhesive layer (not shown) provided on the uppermost surface of the spacer 6. The lower substrate 2 has an outer rim bonded to the lower end of the spacer 6 by an adhesive layer (not shown) provided on the lower surface of the spacer 6. This arrangement allows the upper resistor layer 3 to face the lower resistor layer 4 at a predetermined space 7 between the layers.

The touch panel is mounted to a screen of a display, such as a liquid crystal display, and the upper and lower electrodes are connected to a control circuit (not shown) in an electronic apparatus.

A user presses the upper substrate 1 with a finger or a touch pen while viewing the screen of the display through the touch panel. The upper substrate 1 accordingly deflects and causes a pressed portion of the upper resistor layer 3 to contact the lower resistor layer 4. The control circuit supplies voltages to the upper and lower electrodes and measures a voltage ratio between the electrodes so as to determine the position of the pressed portion. The control circuit activates various functions of the electronic apparatus circuit according to the detected position.

The conventional touch panel is however constructed with a number of components, such as the upper substrate 1, the upper resistor layer 3, the space 7, the lower resistor layer 4, and the lower substrate 2. These components reflect external light at upper and lower surfaces of the components, thus reducing transparency. This disturbs the user's view of the display through the touch panel.

The space 7 may generate an optical interference pattern, such as a Newton's ring. The Newton's ring may be reduced by filling the space 7 with silicone oil or the like, however, this process increases the overall number of processes for manufacturing the touch panel, and thus makes the touch panel expensive.

SUMMARY OF THE INVENTION

A touch panel includes a light-transmissible, piezoelectric substrate having a first surface and a second surface opposite to the first surface of the piezoelectric substrate, a first light transmissible, resistor layer provided on the first surface of the substrate, and a second light transmissible, resistor layer provided on the second surface of the substrate. A portion of the piezoelectric substrate, upon being pressed, has an electric resistance locally decreasing.

The touch panel, even having a simple construction, can avoid reflections of external light and suppress a Newton's ring.

DETAILED DESCRIPTION OF THE PREFERRED EMBODIMENTS

Figure 1:
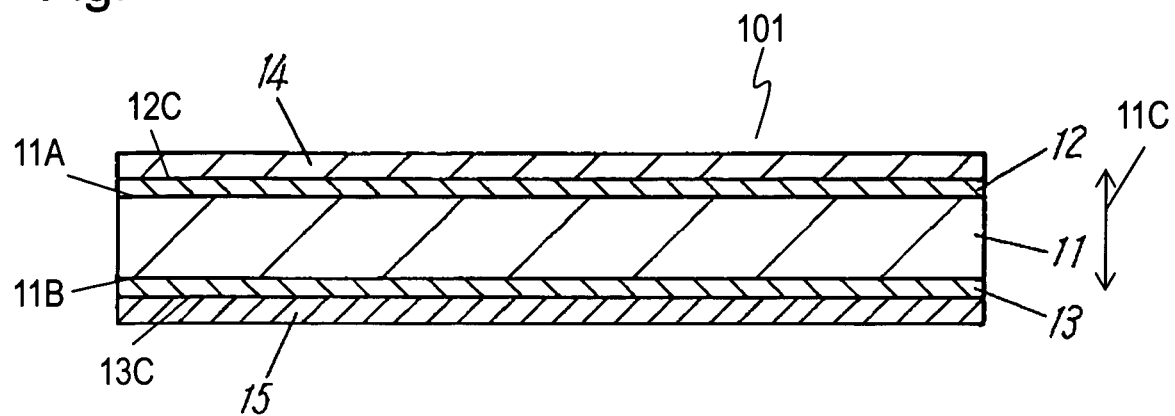
FIG. 1 is a cross sectional view of a touch panel according to an exemplary embodiment of the present invention.
Figure 2:
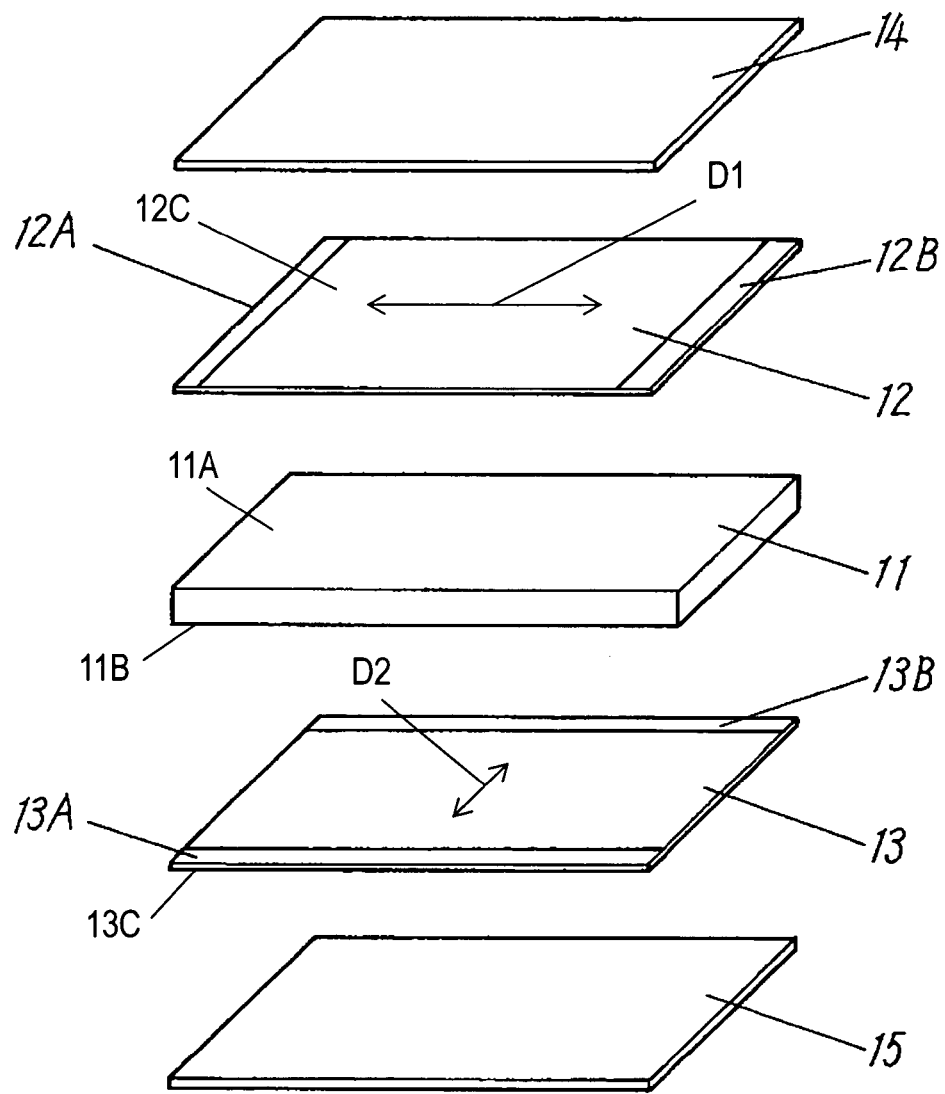
FIG. 2 is an exploded perspective view of the touch panel according to the embodiment.

FIG. 1 is a cross sectional view of a touch panel 101 according to an exemplary embodiment of the present invention. FIG. 2 is an exploded perspective view of the touch panel 101. An upper resistor layer 12 made of light transmissible material, such as indium tin oxide or tin oxide, is formed by, for example, vacuum sputtering on the upper surface 11A of a light-transmissible, piezoelectric substrate 11 made of piezoelectric material, such as poly-vinylidene fluoride, and has a thickness ranging from 150 μm to 200 μm. A lower resistor layer 13 made of light-transmissible material, such as indium tin oxide or tin oxide, is deposited on the lower surface 11B of the substrate 11 by, for example, vacuum sputtering. The upper resistor layer 12 has an upper surface 12C coated with a hard coat layer 14 made of transparent insulating resin, such as acrylic resin, polyester resin, or epoxy resin. The lower resistor layer 13 has a lower surface 13C coated with an insulating layer 15 made of transparent insulating resin, such as acrylic resin, polyester resin, or epoxy resin. A pair of upper electrodes 12A and 12B made of electrically conductive material, such as silver or carbon, are provided on left and right ends of the upper resistor layer 12 by printing. A pair of lower electrodes 13A and 13B are provided on front and rear ends of the lower resistor layer 13. This arrangement provides the touch panel 13. The upper electrodes 12A and 12B are arranged in a direction D1 orthogonal to a direction D2 in which the lower electrodes 13A and 13B are arranged.

When a voltage is applied to the piezoelectric substrate 11 made of poly-vinylidene fluoride and having a film sheet shape in its thickness direction, a molecular structure of the substrate changes from random orientation into regular lattice orientation. When a voltage is applied between the resistor layers 12 and 13, the substrate 11 is polarized, and, for example, the upper surface 11A has a positive charge, while the lower surface 11B has a negative charge. While being polarized, the piezoelectric substrate 11 is pressed, and becomes conductive in a thickness direction 11C at the pressed portion. More specifically, the pressed portion locally has an electric resistance smaller than before the pressing. An electric resistance of an area surrounding the pressed portion changes less than that of the pressed portion, or may not change. That is, the pressed portion of the substrate 11 has the electric resistance smaller than other areas including the surrounding area.

Figure 3:
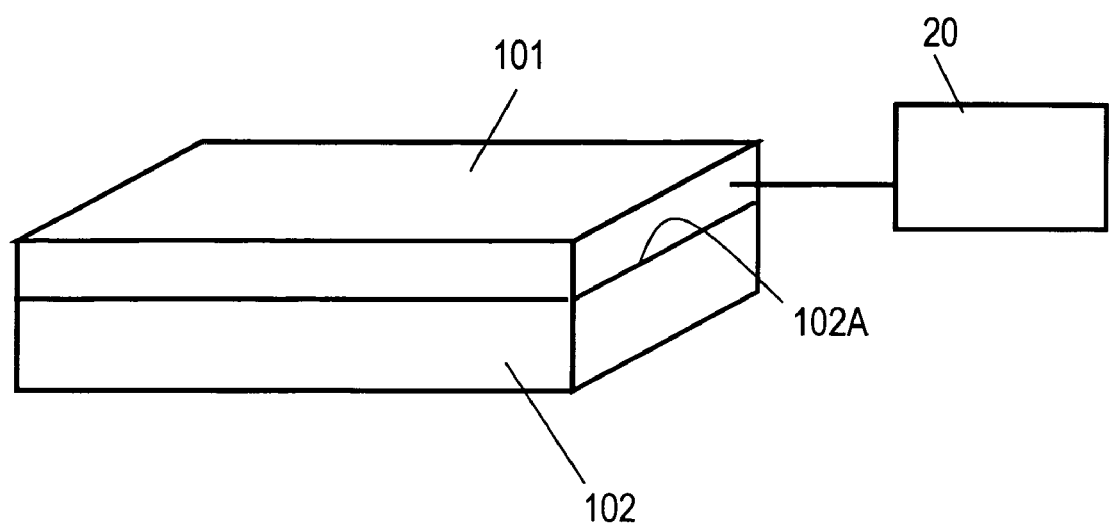
FIG. 3 is a schematic view of an input device according to the embodiment.
Figure 4:
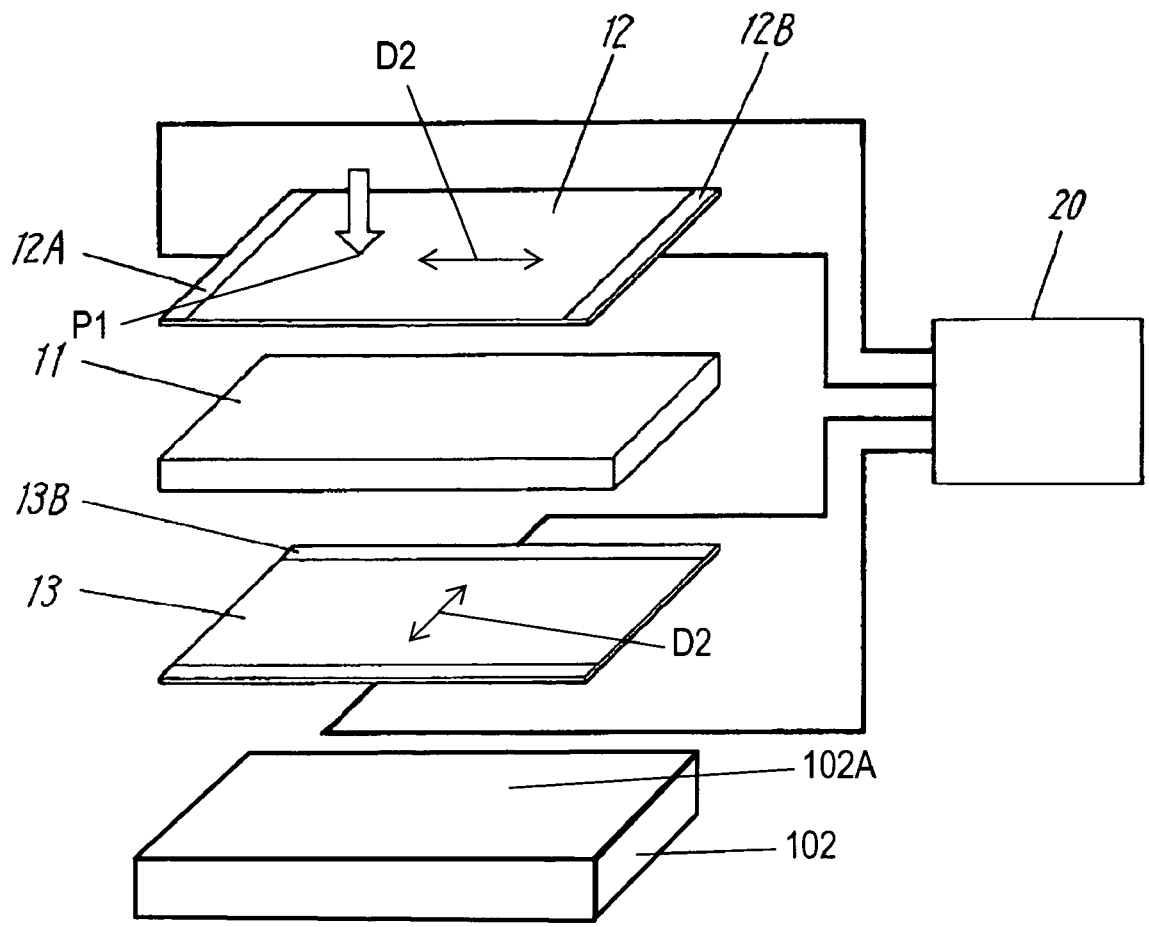
FIG. 4 is an exploded perspective view of the input device of the embodiment.
Figure 5:
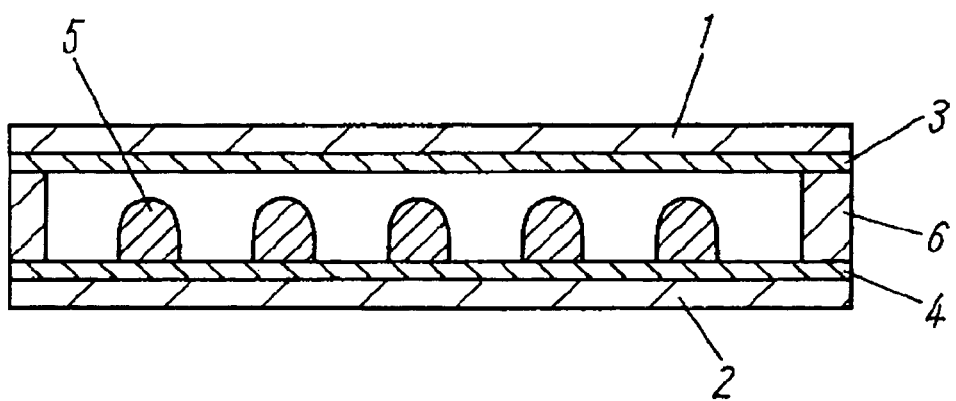
FIG. 5 is a cross sectional view of a conventional touch panel.

FIG. 3 is a schematic view of an input device according to the embodiment. FIG. 4 is an exploded constructive view of the input device. The touch panel 101 is mounted on a screen 102A of a display device 102, such as a liquid crystal display, in an electronic apparatus. The upper electrodes 12A and 12B and the lower electrodes 13A and 13B are coupled to a control circuit 20 implemented by a microcomputer or the like, thus providing the input device.

An operation of the input device including the touch panel of the embodiment will be described. A user presses a position P1 on the upper surface of the hard coat layer 14 with a finger or a touch pen while viewing the screen 102A of the display device 102 through the touch panel 101. Upon being pressed thorough the hard coat layer 14 and the upper resistor layer 12, the substrate 11 is compressed beneath the position P1. The pressing operation decreases distances between molecules in lattice arrangement at the pressed portion of the substrate 11, and accordingly makes an electric resistance of the pressed portion smaller than other portions which are not pressed.

Then, the control circuit 20 supplies a voltage between the upper electrodes 12A and 12B of the upper resistor layer 12. The control circuit 20 then measures a potential at the pressed position of the upper resistor layer 12 through the lower electrodes 13A and 13B of the lower resistor layer 13 and through the pressed portion of the substrate 11. The control circuit 20 determines the position of the pressed portion along the direction D1 according to a ratio of the measured potential to the supplied voltage.

Then, the control circuit 20 supplies a voltage between the lower electrodes 13A and 13B of the lower resistor layer 13. The control circuit 20 then measures a potential at the pressed portion of the lower resistor layer 13 through the upper electrodes 12A and 12B of the upper resistor layer 12 and through the pressed portion of the substrate 11. The control circuit 20 determines the position of the pressed portion along the direction D2 according to a ratio of the measured potential to the supplied voltage.

As described above, the control circuit 20 determines the pressed position P1 based on the positions along the directions D1 and D2. The control circuit activates various functions of the electronic apparatus.

As set forth above, the touch panel 101 of the embodiment includes the substrate 11, the upper resistor layer 12, the lower resistor layer 13, the hard coat layers 14, and the insulating layer 15, and thus, does not have the inner space 7 between the resistor layers shown in FIG. 6. This arrangement prevents the touch panel 101 from reflecting external light, such as sun light or artificial light, and generating a Newton's ring. Hence, the user clearly views the screen 102A of the display device 102 through the touch panel 101.

When a voltage is applied between the resistor layers 12 and 13, the piezoelectric substrate 11 of poly-vinylidene fluoride is polarized so that molecules are regularly oriented in lattice form. Hence, when the control circuit 20 applies a voltage between the upper resistor layer 12 and the lower resistor layer 13, the pressed portion of the piezoelectric substrate 11 vibrates by piezoelectric effect. The vibration is then transmitted via the finger or the touch pen to the user, hence creating a click feel upon the pressing operation.

The voltage supplied by the control circuit 20 for determining the pressed position is about 5V. The control circuit may apply a voltage of several tens of volts higher than the voltage for the determining between resistor layers 12 and 13 when detecting that the touch panel 101 is pressed. The higher the voltage applied between resistor layers 12 and 13, the more the substrate 11 vibrates. Hence, the high voltage provides a clear click feel.

The hard coat layer 14 and the insulating layer 15 on the resistor layers 12 and 13 prevent the upper resistor layer 12 from being worn away due to the pressing operation, and improve electrically-insulating properties.

In the touch panel 101 according to the embodiment, the upper electrodes 12A and 12B are arranged in the direction D1 orthogonal to the direction D2 in which the lower electrodes 13A and 13B are arranged. The directions D1 and D1 may not be orthogonal to each other. As long as the directions are non-parallel to each other, the control circuit 20 determines the pressed position P1.

In the touch panel 101 of the embodiment, the surfaces 11A and 11B of the substrate 11 are entirely covered with the upper resistor layer 12 and the lower resistor layer 13, respectively. The upper resistor layer 12 may have a comb-like shape, i.e. may have stripes extending in parallel to each other and having respective one ends joined together, while the lower resistor layer 13 may have a comb-like shape, i.e., may have stripes extending orthogonally to the stripes of the upper resistor layer 12 and having respective one ends joined together.

What is claimed is:

1. A touch panel arranged to detect a position at which the touch panel is pushed by a user, the touch panel comprising:
a light-transmissible, piezoelectric substrate having a first surface and a second surface, the first surface and the second surface being on opposite sides of the piezoelectric substrate;
a first light transmissible, resistor layer provided on the first surface of the piezoelectric substrate, the first resistor layer having a predetermined area in which positions on the first resistor layer at which the first resistor layer is pushable by a user are electrically detectable;
a second light transmissible, resistor layer provided on the second surface of the piezoelectric substrate;
first and second electrode layers provided on the first resistor layer and being connected to the first resistor layer, the first and second electrode layers being arranged at both ends of the first resistor layer, respectively, in a first direction; and
a control circuit operable to supply a voltage between the first and second electrode layers of the first resistor layer,
wherein the piezoelectric substrate is arranged such that the first surface of the piezoelectric substrate is positioned entirely on the predetermined area of the first resistor layer,
wherein the piezoelectric substrate, the first resistor layer and the second resistor layer are arranged such that, in response to the touch panel being pushed, the first resistor layer is pushed at a corresponding position which is located between the first and second electrode layers, and the piezoelectric substrate is pushed by the first resistor layer at a corresponding position on the piezoelectric substrate, wherein a resistance of the piezoelectric substrate at the corresponding position on the piezoelectric substrate is smaller than that of surrounding portions of the piezoelectric substrate, and wherein the control circuit is operable to determine the corresponding position of the first resistor layer based on a ratio of a voltage measured through the piezoelectric substrate to the voltage supplied between the first and second electrode layers.

2. The touch panel according to claim 1, wherein the piezoelectric substrate comprises poly-vinylidene fluoride.

3. The touch panel according to claim 1, further comprising:
third and fourth electrode layers provided on the second resistor layer and connected to the second resistor layer, the third and fourth electrode layers being arranged at both ends of the second resistor layer, respectively, in a second direction non-parallel to the first direction.

4. The touch panel according to claim 3, wherein the first direction is orthogonal to the second direction.

5. The touch panel according to claim 1, further comprising a resin layer provided on the first resistor layer.

6. The input device according to claim 1, wherein the corresponding position of the first resistor layer is arranged at the corresponding position of the piezoelectric substrate.

7. The input device according to claim 1, wherein the corresponding position of the first resistor layer is arranged at the corresponding position of the piezoelectric substrate.

8. An input device arranged to detect a position at which the input device is pushed by a user, the input device comprising:
a touch panel including
a light-transmissible, piezoelectric substrate having a first surface and a second surface, the first surface and the second surface being on opposite sides of the piezoelectric substrate,
a first light transmissible, resistor layer provided on the first surface of the piezoelectric substrate, the first resistor layer having a predetermined area in which positions on the first resistor layer at which the first resistor layer is pushable by a user are electrically detectable,
a second light transmissible, resistor layer provided on the second surface of the piezoelectric substrate,
first and second electrode layers provided on the first resistor layer and connected to the first resistor layer, the first and second electrode layers being arranged at both ends of the first resistor layer, respectively, in a first direction, and
third and fourth electrode layers provided on the second resistor layer and connected to the second resistor layer, the third and fourth electrode layers being arranged at both ends of the second resistor layer, respectively, in a second direction non-parallel to the first direction,
wherein the piezoelectric substrate is arranged such that the first surface of the piezoelectric substrate is positioned entirely on the predetermined area of the first resistor layer,
wherein the piezoelectric substrate, the first resistor layer and the second resistor layer are arranged such that, in response to the input device being pushed, the first resistor layer is pushed at a corresponding position which is located between the first and second electrode layers and between the third and fourth electrode layers, and the piezoelectric substrate is pushed by the first resistor layer at a corresponding position on the piezoelectric substrate, and wherein a resistance of the piezoelectric substrate at the corresponding position on the piezoelectric substrate is smaller than that of surrounding portions of the piezoelectric substrate; and a control circuit coupled to the first to fourth electrode layers, the control circuit being operable to supply a first voltage between the first electrode layer and the second electrode layer, and to detect the corresponding position of the first resistor layer based on a ratio of a voltage measured through the piezoelectric substrate to the first voltage.

9. The input device according to claim 8, wherein the piezoelectric substrate comprises poly-vinylidene fluoride.

10. The input device according to claim 8, wherein the first direction is orthogonal to the second direction.

11. The input device according to claim 8,
wherein the control circuit is operable to supply a second voltage between the first resistor layer and the second resistor layer when the input device is pushed, and
wherein the supplied second voltage causes the piezoelectric substrate to vibrate by polarizing the piezoelectric substrate.

12. The input device according to claim 11, wherein the second voltage is higher than the first voltage.

13. A touch panel arranged to detect a position at which the touch panel is pushed by a user, the touch panel comprising:
a light-transmissible, piezoelectric substrate having a first surface and a second surface, the first surface and the second surface being on opposite sides of the piezoelectric substrate;
a first light transmissible, resistor layer provided on the first surface of the piezoelectric substrate, the first resistor layer having a predetermined area in which positions on the first resistor layer at which the first resistor layer is pushable by a user are electrically detectable;
a second light transmissible, resistor layer provided on the second surface of the piezoelectric substrate;
first and second electrode layers provided on the first resistor layer and being connected to the first resistor layer, the first and second electrode layers being arranged at both ends of the first resistor layer, respectively, in a first direction; and
a control circuit operable to supply a voltage to between the first and second electrode layers of the first resistor layer,
wherein the first resistor layer and the piezoelectric substrate are arranged such that an entirety of the predetermined area of the first resistor layer is in contact with the first surface of the piezoelectric substrate,
wherein the piezoelectric substrate, the first resistor layer and the second resistor layer are arranged such that, in response to the touch panel being pushed, the first resistor layer is pushed at a corresponding position which is located between the first and second electrode layers, and the piezoelectric substrate is pushed by the first resistor layer at a corresponding position on the piezoelectric substrate,
wherein a resistance of the piezoelectric substrate at the corresponding position on the piezoelectric substrate is smaller than that of surrounding portions of the piezoelectric substrate, and
wherein the control circuit is operable to detect the corresponding position of the first resistor layer based on a ratio of a voltage measured through the piezoelectric substrate to the voltage supplied between the first and second electrode layers.

14. The touch panel according to claim 13, wherein the piezoelectric substrate comprises poly-vinylidene fluoride.

15. The touch panel according to claim 13, further comprising:

third and fourth electrode layers provided on the second resistor layer and connected to the second resistor layer, the third and fourth electrode layers being arranged at both ends of the second resistor layer, respectively, in a second direction non-parallel to the first direction.

16. The touch panel according to claim 15, wherein the first direction is orthogonal to the second direction.

17. The touch panel according to claim 16, further comprising a resin layer provided on the first resistor layer.

18. An input device arranged to detect a position at which the input device is pushed by a user, the input device comprising:

a touch panel including a light-transmissible, piezoelectric substrate having a first surface and a second surface, the first surface and the second surface being on opposite sides of the piezoelectric substrate, a first light transmissible, resistor layer provided on the first surface of the piezoelectric substrate, the first resistor layer having a predetermined area in which positions on the first resistor layer at which the first resistor layer is pushable by a user are electrically detectable, a second light transmissible, resistor layer provided on the second surface of the piezoelectric substrate, first and second electrode layers provided on the first resistor layer and connected to the first resistor layer, the first and second electrode layers being arranged at both ends of the first resistor layer, respectively, in a first direction, and third and fourth electrode layers provided on the second resistor layer and connected to the second resistor layer, the third and fourth electrode layers being arranged at both ends of the second resistor layer, respectively, in a second direction non-parallel to the first direction, wherein the first resistor layer and the piezoelectric substrate are arranged such that an entirety of the predetermined area of the first resistor layer is in contact with the first surface of the piezoelectric substrate, wherein the piezoelectric substrate, the first resistor layer and the second resistor layer are arranged such that, in response to the input device being pushed, the first resistor layer is pushed at a corresponding position which is located between the first and second electrode layers and between the third and fourth electrode layers, and the piezoelectric substrate is pushed by the first resistor layer at a corresponding position on the piezoelectric substrate, and wherein a resistance of the piezoelectric substrate at the corresponding position on the piezoelectric substrate is smaller than that of surrounding portions of the piezoelectric substrate, the corresponding position of the first resistor layer being arranged at the corresponding position of the piezoelectric substrate; and a control circuit coupled to the first to fourth electrode layers, the control circuit being operable to supply a first voltage between the first electrode layer and the second layer, and to detect the corresponding position of the first resistor layer based on a ratio of a voltage measured through the piezoelectric substrate to the first voltage.

19. The input device according to claim 18, wherein the piezoelectric substrate comprises poly-vinylidene fluoride.

20. The input device according to claim 18, wherein the first direction is orthogonal to the second direction.

21. The input device according to claim 18, wherein the control circuit is operable to supply a second voltage between the first resistor layer and the second resistor layer when the input device is pushed, and wherein the supplied second voltage causes the piezoelectric substrate to vibrate by polarizing the piezoelectric substrate.

22. The input device according to claim 21, wherein the second voltage is higher than the first voltage.

\* \* \* \* \*

UNITED STATES PATENT AND TRADEMARK OFFICE
CERTIFICATE OF CORRECTION

PATENT NO. : 7,714,845 B2 Page 1 of 1
APPLICATION NO. : 10/967136
DATED : May 11, 2010
INVENTOR(S) : Kenichi Matsumoto et al.

It is certified that error appears in the above-identified patent and that said Letters Patent is hereby corrected as shown below:

In column 6, claim 13, (original claim 14), line 43, "voltage to between" should read --voltage between--.

Signed and Sealed this

Twenty-seventh Day of July, 2010

David J. Kappos
*Director of the United States Patent and Trademark Office*